Figure 1:
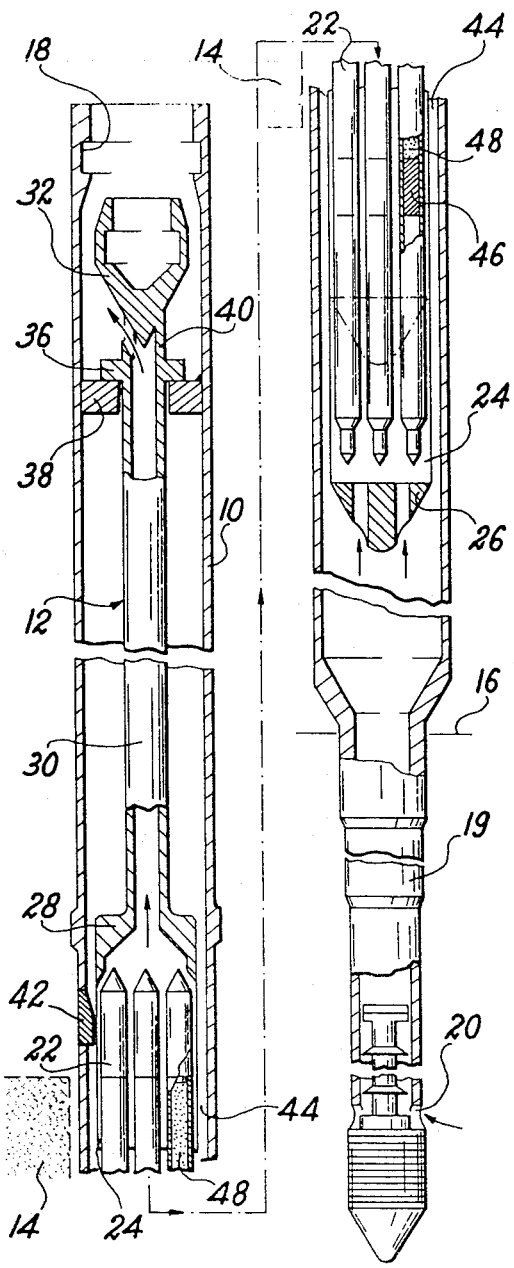

United States Patent [19]
Marmonier et al.

[11] 3,773,617
[45] Nov. 20, 1973

[54] CONTROL-ROD ASSEMBLY FOR NUCLEAR REACTORS

[75] Inventors: Pierre Marmonier; Kurt Plufgrad, both of Aix-en-Provence, France

[73] Assignee: Commissariat A L'Energie Atomique, Paris, France

[22] Filed: Dec. 13, 1971

[21] Appl. No.: 207,014

[30] Foreign Application Priority Data
Dec. 22, 1970 France.......................... 7046296

[52] U.S. Cl. .............................. 176/36 R, 176/86 R
[51] Int. Cl................................................ G21c 7/10
[58] Field of Search................................. 176/36, 86

[56] References Cited
UNITED STATES PATENTS
| | | | |
|---|---|---|---|
| 3,660,231 | 5/1972 | Fox et al. ............................. | 176/86 |
| 3,445,334 | 5/1969 | Humphries, Jr. ..................... | 176/36 |
| 3,162,579 | 12/1964 | Thomas et al. ...................... | 176/36 |
| 3,280,002 | 10/1966 | Hutter et al. ........................ | 176/36 |
| 2,990,356 | 6/1961 | Chapellier et al. ................... | 176/36 |
| 3,163,581 | 12/1964 | Campbell............................. | 176/36 |

FOREIGN PATENTS OR APPLICATIONS
| | | | |
|---|---|---|---|
| 187,510 | 2/1964 | Sweden................................. | 176/36 |
| 1,178,526 | 9/1964 | Germany .............................. | 176/36 |
| 6,613,379 | 3/1967 | Netherlands.......................... | 176/36 |

OTHER PUBLICATIONS
ANL–5923, Oct. 1958, pp. 18, 19, 20, 21, 22.

Primary Examiner—Harvey E. Behrend
Attorney—Cameron, Kerkan & Sutton

[57] ABSTRACT

An assembly comprising a stationary thimble and a control rod having a neutron-absorbing portion is displaceable vertically between a bottom position in which the absorbing portion is placed within the reactor core and a top position in which it is placed outside the core.

The thimble is provided both beneath and above the reactor core with apertures for the admission and discharge of coolant and with a control-rod guide bearing located above the level of the reactor core.

The clearance left by the bearing between the control rod and the thimble is sufficiently small to ensure that the coolant flow between these latter is a small fraction of the flow which passes through the neutron-absorbing portion.

5 Claims, 2 Drawing Figures

PATENTED NOV 20 1973   3,773,617

CONTROL-ROD ASSEMBLY FOR NUCLEAR REACTORS

The thimble is provided both beneath and above the reactor core with apertures for the admission and discharge of coolant and with a control-rod guide bearing located above the level of the reactor core.

The clearance left by the bearing between the control rod and the thimble is sufficiently small to ensure that the coolant flow between these latter is a small fraction of the flow which passes through the neutron-absorbing portion.

This invention relates to nuclear reactor control rods, especially for a fast power reactor which is cooled by circulation of liquid sodium. In reactors of this type, it is necessary to cool the neutron-absorbing portion in which a substantial amount of heat is released. In order to achieve this result, provision is made around the rod for a thimble which is provided both at the lower end and upper end with apertures for the admission and discharge of a coolant. The terms "control rod assembly" will be employed hereinafter to designate the assembly which is formed by the control rod and the thimble.

The control rod proper comprises a portion containing a neutron-absorbing material and is displaceable between a top position in which the absorbing portion is located outside the intense neutron flux zone of the reactor and a bottom position in which the absorbing portion is located within the reactor core.

The control rods employed in fast reactors are usually constituted by a cluster of pins. In order to ensure effective cooling in this case, at least the greater part of the coolant within the thimble must clearly circulate between the pins. It could reasonably be assumed that the control rod need only be provided with a sleeve fitted with a tubular bottom end-fitting slidably mounted within a guide ring which is arranged at the lower end of the thimble. The constriction produced by the guide ring must correspond to a very small clearance. While apparently satisfactory, this solution has nevertheless a very serious disadvantage in reactors which have a high neutron flux. In fact, when the reactor is in operation, the control rod is lifted and the tubular end-fitting is located at the level of the reactor core in a zone in which the neutron flux is close to the maximum value whereas the guide ring is located in a diagrid beneath the reactor core and is subjected to a very much lower neutron flux. Flux-induced swelling of materials which are suitable for the end-fitting (especially stainless steel) gives rise to a potential danger of jamming of the end-fitting in the ring when the control rod is released for shut-down of the reactor. This involves an unacceptable risk which makes it necessary either to rule out this arrangement in reactors having high neutron flux and power levels or to replace the control rod a long time before its loss of neutron absorption justifies such a measure.

The invention is primarily intended to provide a control-rod assembly which is not subject to the disadvantages referred-to above. To this end, the invention proposes an assembly comprising a stationary thimble and a control rod having a neutron-absorbing portion, a head which serves to grip the rod and to displace it vertically between a bottom position in which the neutron-absorbing portion is located within the reactor core and a top position in which said portion is located outside the core and an end-fitting which is at the level of the core when the control rod is in the top position, said thimble being provided both beneath and above the reactor core with apertures for the admission and discharge of reactor coolant. The assembly essentially comprises a bearing disposed between the control rod and the thimble at a level which is higher than that of the reactor core and at the top portion of the thimble so as to leave a sufficiently small clearance to ensure that the flow of coolant which circulates between the thimble and the control rod is a small fraction of the flow which is admitted into the thimble and discharged therefrom.

Figure 2:
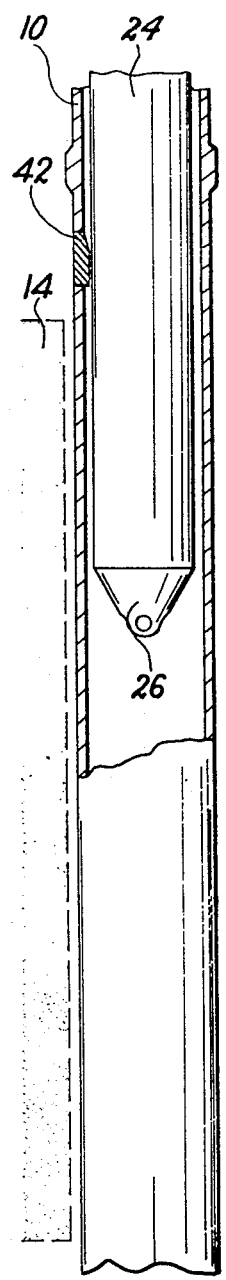

A clearer understanding of the invention will be obtained from the following description of a control-rod assembly which is proposed for sodium-cooled fast power reactors and constitutes one embodiment of the invention as given by way of example without any limitation being implied. In the description, reference will be made to the accompanying drawings, in which :

FIG. 1 is a very diagrammatic sectional view taken along the vertical mid-plane of the control-rod assembly ; and FIG. 2 is a view in elevation and partly in section, of a portion of the assembly of FIG. 1, the control rod being shown in the top position.

The control-rod assembly which is illustrated in FIG. 1 comprises a vertical thimble 10 and a control rod 12. The thimble 10 can be considered as being made up of a top portion having a constant transverse section (circular in the example illustrated) which extends beyond the reactor core 14 (the position of the core being shown diagrammatically in dashed lines) at the top of this latter and also at the bottom down to the level of the diagrid, the top face of which is indicated by the dashed line 16. The upper extremity of the thimble 10 is provided with an internal annular recess 18 for gripping the thimble 10 by means of a grab or handling tongs (not shown) and for lifting the control-rod assembly from the reactor core. The thimble 10 extends into the diagrid by means of a nose 19 having a smaller section than the top portion and provided with apertures 20 for the admission of liquid sodium which is intended to cool the control rod. This sodium circulates along the path indicated by the arrows and passes out of the thimble at the top portion of this latter.

The control rod 12 comprises a bottom portion constituted by a cluster of pins 22 (there are seven pins in the example of FIG. 1 but only three of these latter are visible) which are disposed on a uniform lattice within a sleeve 24. This sleeve 24 is provided at the lower extremity with a cone 26 pierced by holes for the admission of sodium and at the upper extremity with an end-piece 28 which provides a connection with a tubular stem 30, said stem being in turn connected to a handling head 32 in which is formed an annular recess. Handling tongs (not shown) which are connected to a control-rod drive mechanism are designed to permit insertion of these latter in the annular recess.

In FIG. 1, the control rod is shown as being separated from the drive mechanism, beyond the bottom position in which the drive mechanism brings the rod into the position of maximum absorption. The control rod is then retained by application of a flange 36 of the tubular stem 30 against a bearing 38 which is carried by the internal wall of the thimble. Between the head 32 and the flange 36, the stem is pierced by holes 40 for the discharge of sodium which circulates along the path indicated by the arrows in full lines in FIG. 1.

In order to prevent a substantial proportion of the flow of sodium coolant which penetrates through the apertures 20 from flowing into the annular passage between the sleeve 24 and the thimble 10 instead of flowing inside the sleeve and cooling the pins 22, the bearing 38 which serves to guide the control rod leaves only a small clearance (a few tenths of a mm) and throttles the passage. The clearance is so selected that the fraction of the toal flow in the annular passage is lower than 30 percent. In most cases, the clearance will generally be such that the fraction does not exceed 20 percent.

This arrangement affords a large number of advantages :

on the one hand, the control-rod stem 30 which slides within the bearing 38 is entirely and permanently located outside the reactor core and is separated therefrom by the neutron-absorbing portion. In consequence, the risk of swelling of the stem (usually formed of stainless steel) is practically non-existent ;

on the other hand, the bearing 38 is also less exposed to radiation than if it had been placed beneath the reactor core. In fact, the bearing is protected from the neutron flux of the core by the absorbing portion of the control rod itself.

The pins which are shown by way of example are of the type described in French Pat. application No. EN 6,915,504 (Pat. publication No. 2,041,723. The pins each comprise a central neutron-absorbing zone in two portions. The can of each needle contains a lower portion 46 of tantalum and a much longer upper portion of boron carbide. It would in any case be possible to replace these two materials by an alternative pair which would satisfy the conditions mentioned in the above-cited patent application.

In order to guide the control rod, the thimble is provided immediately above the reactor core 14 with three guiding pastilles or inserts 42. These guiding means can in any case be dispensed with if the fitting of the control-rod head over the drive mechanism is sufficient to ensure alignment of the control rod. It should be noted that the inserts 42 must allow a fairly substantial clearance to remain. In fact, the sodium which is discharged from the compartment formed between the stem 30, the thimble 10 and the bearing 38 when the control rod moves upwards (or which is admitted therein when the rod moves downwards) must be permitted by the inserts to pass through without excessive hydraulic damping. Moreover, the clearance must permit any possible swelling of the body of the control rod although this swelling remains slight in that portion of the control rod which slides within the inserts by reason of the fact that this portion is entirely located outside the reactor core when the rod is in the uplifted position, that is to say under normal operating conditions corresponding to maximum neutron flux within the reactor core.

By adopting the foregoing arrangement, the service life of the control rod and of the thimble is extended over a period which is considerably longer than in the case of devices which involve the risk of jamming and consequently the need to remove the control rods a long time before this is justified by loss of efficiency of the rods. Moreover, it becomes possible to carry out the simultaneous replacement of both rod and thimble or, in other words, the complete assembly considered as a single unit. The arrangement hereinabove described makes it possible to carry out this operation in a simple manner. It is in fact only necessary to release the control rod in order that this latter should come into the position illustrated in FIG. 1 and provide access to the annular recess 18. The device for handling the fuel assemblies (not shown in the drawings) can then grip the thimble, this being carried out all the more easily since provision can be made for a single gripping level for all units to be handled, whether control-rod assemblies or fuel assemblies.

It can be mentioned by way of example that a device of the type described above has been constructed for a fast reactor having power level of 250 MWe and a height of reactor core of 0.85 m. The bearing affords a radial clearance of the order of 0.2 mm and is located at approximately 1.50 m above the reactor core. The maximum travel of the control rod is 1.1 m.

What we claim is :

1. In a nuclear reactor system having a cooling system for a control rod assembly for a nuclear reactor having a core, at least one control rod for said core and cooled by the circulation of a liquid coolant comprising a vertical stationary thimble for each control rod, said rod sliding in said thimble, said rod comprising a cluster of parallel neutron-absorbing pins, a sleeve surrounding said pins, a tubular stem connected to and in fluid communication with said sleeve, a grip receiving head connected to said stem for displacement of said rod vertically between a bottom position in which the neutron-absorbing pins are within the reactor core and a top position in which said pins are outside said core and an end-fitting for said rod connected to the bottom of said sleeve for admitting coolant to the interior of said sleeve which is at the level of the core when said control rod is in the top position, openings in said thimble beneath and above the reactor core for the admission, upward circulation and discharge of coolant, a bearing at the upper portion of said thimble guiding said stem, said bearing having a small axial length with respect to the amplitude of displacement of said rod, said bearing being above the reactor core, a clearance between said control rod and said bearing controlling the amount of said flow of coolant between said thimble and said stem to a small fraction less than 30 percent of the flow through said thimble and through said stem and discharged from said stem above said bearing after having passed between said neutron-absorbing pins and additional guiding means for said sleeve in said thimble above the core and below said bearing.

2. A control rod assembly in accordance with claim 1, said additional guiding means including inserts for said sleeve in said thimble above the core and below said bearing having a constant transverse section, and apertures in said sleeve at its lower and upper extremities for the admission and discharge of coolant.

3. A control rod assembly in accordance with claim 1, including a flange at the upper portion of said rod engaging said bearing when said rod is in bottom position in the core.

4. A control rod assembly in accordance with claim 1, including a grip receiving recess in the upper portion of said thimble accessible when said control rod is in bottom position.

5. A control rod assembly in accordance with claim 2, said guiding means including three inserts in said thimble spaced for the circulation of the coolant.

* * * * *